Dec. 25, 1962 S. H. OLSEN ETAL 3,069,802
FISHING SINKER
Filed Oct. 4, 1957

Sigurd H. Olsen
Edward M. Fitzgerald
INVENTORS

United States Patent Office 3,069,802
Patented Dec. 25, 1962

3,069,802
FISHING SINKER
Sigurd H. Olsen, P.O. Box 66, Lytle Creek, Calif., and
Edward M. Fitzgerald, 325 N. Orange St., Rialto, Calif.
Filed Oct. 4, 1957, Ser. No. 688,208
2 Claims. (Cl. 43—44.95)

The present invention relates to new and useful improvements in fishing line sinkers, and has for its primary object to provide, in a manner as hereinafter set forth, a sinker which is adapted to be expeditiously and firmly but removably mounted at any desired point on a fishing line or leader without the use of tools.

Another important object of the invention is to provide a sinker comprising a clip of a novel construction for permitting adjustment of the sinker on the line or leader and for frictionally securing said sinker in adjusted position.

Other objects of the invention are to provide a sinker of the aforementioned character which will be comparatively simple in construction, durable, compact, and which may be manufactured at low cost.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
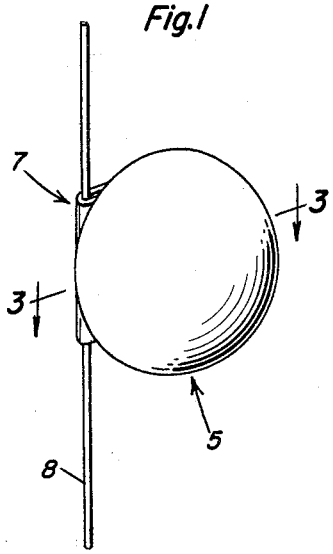
FIGURE 1 is a front perspective view showing a fishing sinker embodying the present invention mounted on a line.
Figure 2:
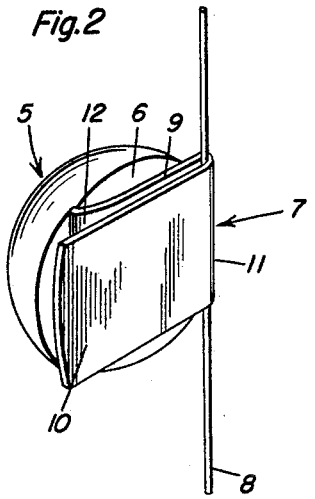
FIGURE 2 is a rear perspective view thereof.
Figure 3:
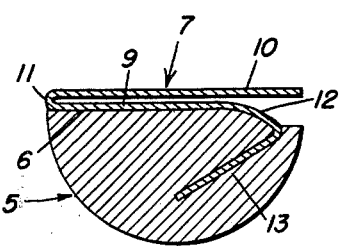
FIGURE 3 is a sectional view through the device, taken substantially on the line 3—3 of FIGURE 1.
Figure 4:
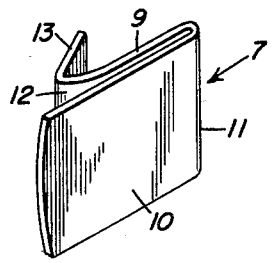
FIGURE 4 is a perspective view of the resilient clip.

Referring now to the drawing in detail, it will be seen that the embodiment of the invention which has been illustrated comprises a substantially hemispherical body of suitable metal, preferably molded lead, which is designated generally by reference character 5. The body 5 may be of any desired dimensions. Mounted on the substantially flat face or base 6 of the body 5 is a clip 7 of suitable resilient metal which is engageable with a fishing line, as indicated at 8, for adjustably and removably mounting said body thereon.

The clip 7, which is substantially U-shaped and of a material width, comprises inner and outer jaws or legs 9 and 10, respectively, which are joined at one end by a bight portion 11.

The leg 9 of the clip 7 comprises an arcuate or curved guide portion 12 which is opposed to the free end portion of the leg 10 and which facilitates the insertion of the line 8 in said clip in an obvious manner. The leg 9 of the clip 7 terminates in an acutely bent free end portion 13 which is molded in the body 5. If desired, the attaching portion 13 of the clip 7 may be notched, perforated or dented for the reception of the metal of the body 5 for further anchoring said clip thereto.

It is thought that the use of the sinker will be readily apparent from a consideration of the foregoing. Briefly, to mount the sinker on the fishing line 8, said line is slipped into the clip 7 and engaged with the bight portion 11 thereof. Thus, the sinker is removably secured in any desired position on the line. The construction is such that the line is firmly and uniformly gripped throughout the width of the clip 7. However, the resilient clip 7 will permit the sinker to be longitudinally adjusted on the line, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing line sinker comprising a substantially hemispherical lead body having a convex face and a flat circular face, and a clip through the medium of which said body may be clipped frictionally and held against displacement on the fishing line once it is placed in a desired position on the line, said clip being U-shaped in form and embodying a flat strip of suitably resilient metal bent upon itself between its ends to provide inner and outer legs, the outer leg being of a length slightly greater than the length of the inner leg and said inner leg being superimposed upon said flat face and one end portion thereof being arcuately bent and provided with a return bend which is disposed at an oblique angle relative to the plane of said inner leg and flat face and being embedded in said body, the long leg being of a length approximately the same as the diameter of said body and said arcuately bent portion terminating inwardly of the free end of the long leg providing a restricted space between the arcuate portion and said free end to facilitate passing of the line between said legs, and said legs being close together in line-gripping association.

2. A fishing line sinker comprising a sinker of requisite weight having a flat body of prescribed area, and a clip by way of which the flat surfaced side of said body may be readily attached to and detached from a fishing line, said clip being generally U-shaped in form and made from flat-faced strap metal, portions of the metal being tempered to the desired degree of resiliency, said clip embodying similar inner and outer legs disposed in close parallel line gripping relationship, said inner leg being superimposed upon said flat surface with the one end substantially even with one marginal edge of the surface, the other end having an oblique angled terminal portion constituting a return-bend and said return-bend being embedded at an oblique angle in the body of the sinker, said return bend being spaced from a portion of said marginal edge diametrically opposite to the first mentioned marginal edge portion, and that part of the inner leg between the return-bend and leg proper being arcuate and providing a convex surface, said outer leg having a free end portion extending beyond the arcuate portion as well as the junctional connection between the arcuate portion and oblique angled return bend and terminating substantially even with an adjacent marginal portion of the sinker body and defining a piloting mouth to facilitate guiding and directing a portion of a fishing line between the legs to be frictionally and yieldingly gripped and held by said legs.

References Cited in the file of this patent

UNITED STATES PATENTS

| 140,211 | McCarthy | June 24, 1873 |
| 2,592,967 | Snapps | Apr. 15, 1952 |

FOREIGN PATENTS

| 465,254 | Canada | May 23, 1950 |